(12) United States Patent
Podlesny

(10) Patent No.: US 10,747,901 B2
(45) Date of Patent: Aug. 18, 2020

(54) HIGH-DIMENSIONAL DATA ANONYMIZATION FOR IN-MEMORY APPLICATIONS

(71) Applicant: SAP SE, Walldorf (DE)

(72) Inventor: Nikolai Jannik Podlesny, New York, NY (US)

(73) Assignee: SAP SE, Walldorf (DE)

( * ) Notice: Subject to any disclaimer, the term of this patent is extended or adjusted under 35 U.S.C. 154(b) by 335 days.

(21) Appl. No.: 15/923,613

(22) Filed: Mar. 16, 2018

(65) Prior Publication Data

US 2019/0286848 A1    Sep. 19, 2019

(51) Int. Cl.
| G06F 21/00 | (2013.01) |
| G06F 21/62 | (2013.01) |
| G06N 7/00 | (2006.01) |
| G06F 16/245 | (2019.01) |
| G06F 16/28 | (2019.01) |

(52) U.S. Cl.
CPC ........ G06F 21/6254 (2013.01); G06F 16/245 (2019.01); G06F 16/285 (2019.01); G06N 7/005 (2013.01)

(58) Field of Classification Search
None
See application file for complete search history.

(56) References Cited

U.S. PATENT DOCUMENTS

| 10,318,388 | B2* | 6/2019 | Quiane Ruiz | ....... G06F 11/1453 |
| 2010/0114920 | A1* | 5/2010 | Srivastava | .......... G06F 16/2462 707/757 |
| 2011/0016328 | A1* | 1/2011 | Qu | ....... G06F 21/6254 713/189 |
| 2014/0283097 | A1* | 9/2014 | Allen | .................. G06F 21/6254 726/26 |
| 2015/0067881 | A1* | 3/2015 | Badstieber | .............. G06F 16/13 726/26 |
| 2016/0142378 | A1* | 5/2016 | Sedayao | ............. H04L 63/0421 726/26 |
| 2017/0177683 | A1* | 6/2017 | Koike | ..................... G06F 7/026 |
| 2019/0130131 | A1* | 5/2019 | Huang | ................ G06F 21/6254 |
| 2020/0034348 | A1* | 1/2020 | Otsubo | ............... G06F 16/2272 |

* cited by examiner

*Primary Examiner* — Shin-hon (Eric) Chen

(74) *Attorney, Agent, or Firm* — Buckley, Maschoff & Talwalkar LLC

(57) ABSTRACT

A method and system are provided including at least one tabular data set, wherein each data set includes one or more attribute categories defining a record, each attribute category including one or more data values; an anonymization module; and an anonymization processor in communication with the anonymization module and operative to execute processor-executable process steps to cause the system to: receive a first data set at the anonymization module; determine at least one of the attribute categories in the first data set is a first-class identifier; generate a pseudonymous data set by removing the at least one first-class identifier attribute category from the first data set; determine at least two of the attribute categories in the pseudonymous data set are a second-class identifier; manipulate the at least two second-class attribute categories; and generate an anonymized data set based on the at least two manipulated second-class identifier attribute categories. Numerous other aspects are provided.

15 Claims, 9 Drawing Sheets

HIGH-DIMENSIONAL DATA ANONYMIZATION FOR IN-MEMORY APPLICATIONS

BACKGROUND

The collection and analysis of data is used by almost every industry. Increasingly industries are processing large datasets with more and more attributes that describe entities. At times, the data may be anonymized to either enable modern business models, guarantee data privacy enforced by legal practices or to facilitate researchers access to otherwise protected information.

Conventional anonymization practices rely on modifying the data itself or falsifying records in a way that parts of the data cannot be linked back to their original entity while preserving data quality and correlations as much as possible. When applied to high-dimensional (e.g. multiple attribute) datasets, these existing processes may lead to a dramatic loss of data quality.

Systems and methods are desired which support efficient and effective data anonymization.

DETAILED DESCRIPTION

Figure 1:
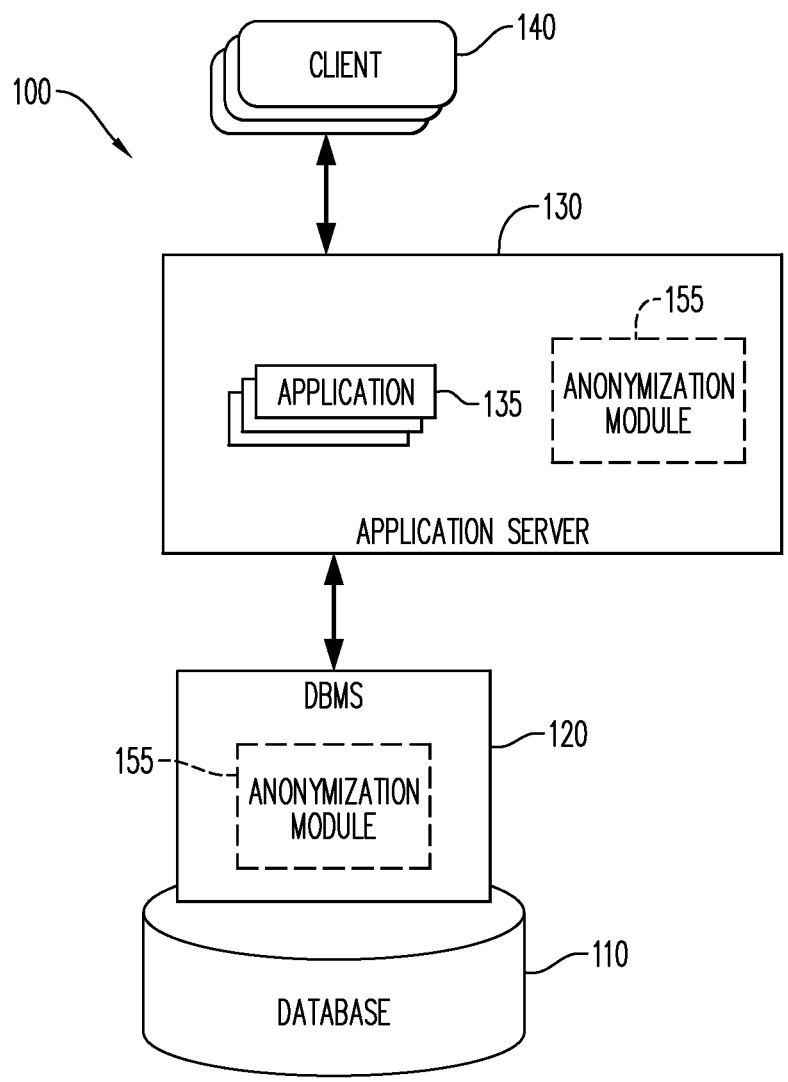
FIG. 1 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

The growth in data collection methods and amounts of data collected have increased the possibilities of obtaining both direct and correlated data to describe an individual to a highly fine-grained degree. However, due to privacy concerns, such personal data may be anonymized for ethical and legal compliance. Often anonymization is a necessary pre-processing step for data analytics on sensitive data such as medical/health data. Effectively anonymizing multi-attribute/high-dimensional datasets is, however, a challenging problem. As used herein, anonymity is the state of being anonymous; where being recognized or identified is impossible or at least improbable. Anonymity is enabled by the absence of outstanding, individual and/or unusual features. A feature may be any kind of information describing the condition, state, behavior or character of a data record. Anonymization refers to the masking, removal or manipulation of identifiers such that no attribute or attribute combination of any tuple length uniquely identifies one original entity or row, with the goal of immensely impeding the recovery of the original data set.

A typical process to anonymize data may include altering the values in the data set to make the values not unique. For example, if the attribute is age and the value is 15, instead of including this data, the typical anonymization process may change the value to a range of ages 10-20. However, this typical process may result in lost data, which may affect the analytics run on the data set.

Embodiments may provide for a data transformation technique termed "attribute compartmentation," whereby instead of altering the actual value that makes an attribute unique, the values that make one or more attributes unique may be identified and then the corresponding individual records may be treated (e.g., altering the way the attributes are combined) to make the data anonymous. For example, a data table may include several columns, where each column lists an attribute, and several rows, where each row is an individual record. Together, the values for the attributes "zip code," "age" and "gender", may together form an identifier. As used herein, the term "identifier" may refer to one or more attributes that link the attribute values to an individual. Embodiments may provide for the modification of the table, so that instead of one table with all three identifier attributes, there are two tables, where one table includes "zip code" and "gender" and the second table includes "zip code" and "age". In one or more embodiments those two tables may be joined using a FULL OUTER JOIN, without compromising the anonymity. While the resulting multiple tables may include overlapping data, there is no, or minimal, loss of data because the data is not being changed, and the overlap is of non-identifying data (e.g., to avoid partial or complete de-anonymization of the original data set).

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135, clients 140, and an anonymization module 155. Applications 135 may comprise server-side executable program code (e.g., compiled code, scripts, etc.) executing within application server 130 to receive queries from clients 140 and provide results to clients 140 based on data of database 110 that has been anonymized via the anonymization module 155. As used herein, the terms "application package" and "application" may be used interchangeably. In embodiments, the anonymization module 155 may be stored on either the application server 130 or the DBMS 120. It is noted that when the anonymization module 155 is part of the DBMS 120, and/or it may be stored as an abstraction layer or function, and may bring better performance than when it is stored elsewhere.

Application server 130 provides any suitable interfaces through which clients 140 may communicate with applications 135 and the anonymization module 155 executing on application server 130. For example, application server 130 and the anonymization module 155 may each include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130, as well as the anonymization module 155 may communicate with DBMS 120 using database management interfaces such as, but not limited to, Open Database Connectivity (ODBC) and Java Database Connectivity (JDBC) interfaces. These types of applications 135 and the anonymization module 155 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 and the anonymization module 155 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients and developers. In addition to exposing the data model, application server 130 may host system services such as a search service.

Database 110 may store data used by applications 135 and the anonymization module 155. For example, database 110 may store personal information for an individual (e.g., home address, e-mail address, gender, age, medical information, other personal information) and/or any other suitable data.

Database 110 may comprise any query-responsive data source or sources that are or become known, including, but not limited to, a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be (reversed) indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in, and/or backed up to, fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 140 may comprise one or more individuals or devices executing program code of a software application for at least one of: executing applications; creating access limitations to data resulting from executed applications, and presenting user interfaces to allow interaction with application server 130. Presentation of a user interface as described herein may comprise any degree or type of rendering, depending on the type of user interface code generated by application server 130. As used herein, the terms "client" and "end-user" may be used interchangeably.

For example, the client 140 may execute a Web Browser to request and receive a Web page (e.g., in HTML format) from a website application 135 of application server 130 via HTTP, HTTPS, and/or WebSocket, and the Web page may be rendered and presented according to known protocols. The client 140 may also, or alternatively, present user interfaces by executing a standalone executable file (e.g., an .exe file) or code (e.g., a JAVA applet) within a virtual machine.

Figure 2:
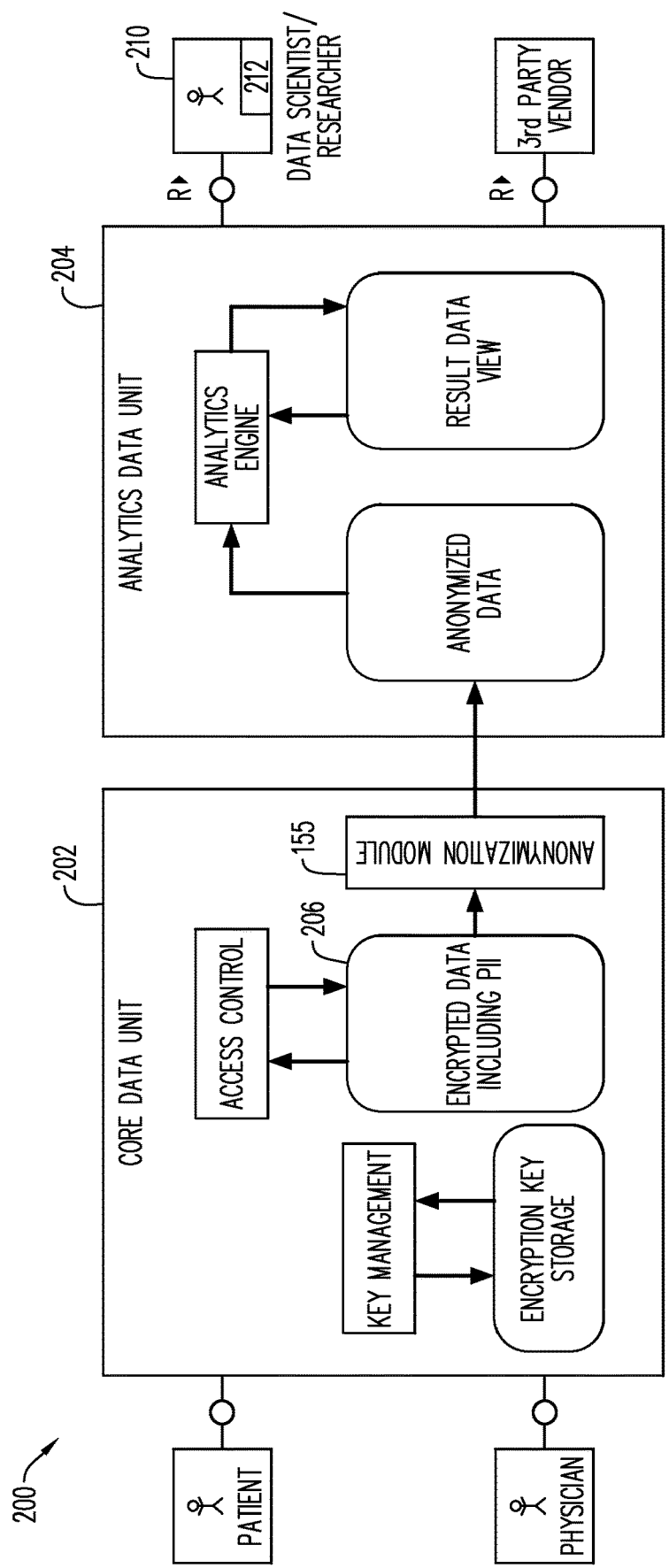
FIG. 2 is a block diagram of a system architecture according to some embodiments.
Figure 3:
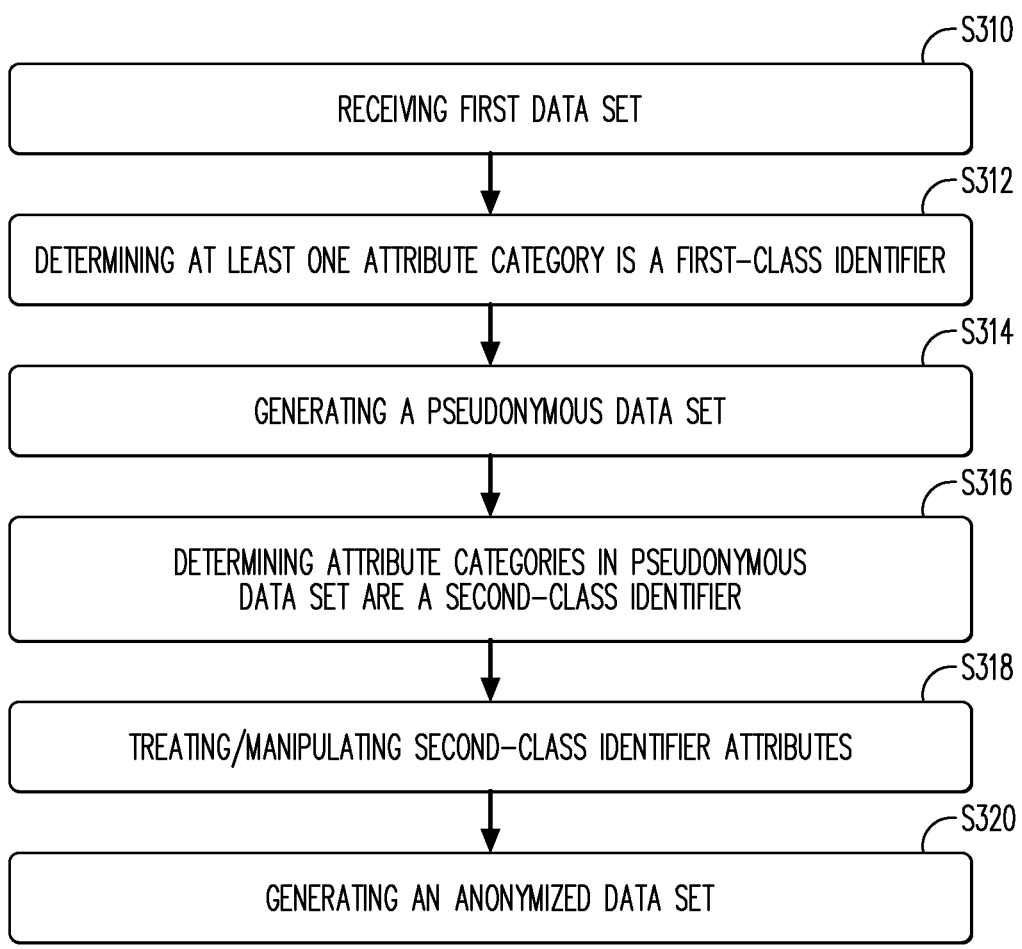
FIG. 3 is a flow diagram of a process according to some embodiments.

One or more embodiments focus on the data transformation denoted as data anonymization between a core data storage 202 and an analytics data storage 204 in an organizational system environment 200 (FIG. 2). While FIG. 2 depicts a healthcare system environment, any suitable environment may be used. In one or more embodiments, the core data storage 202 may act as a data source for the analytics data storage 204. In one or more embodiments, the core data storage 202 may include non-anonymous data 206 describing an individual. In one or more embodiments, the anonymization module 1455 may anonymize the non-anonymized data 206, as described herein, to output anonymous data 208 for receipt by the analytics data storage 204. Then clients 140, such as a researcher 210, may analyze the anonymized data 208 without risk of identifying the individuals described by the data.

FIGS. 3-8 include a flow diagram of process 300 (FIG. 3) described with respect to a system architecture, according to some embodiments. Process 300 may be executed by application server 130 according to some embodiments, e.g., by execution of the anonymization module 155, to provide for the anonymization of data. In one or more embodiments, the application server 130 may be conditioned to perform the process 300, such that a processor 810 (FIG. 8) of the server 130 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A User Interface 212 (FIG. 2) may be presented on any type of display apparatus (e.g., desktop monitor, smartphone display, tablet display) provided by any type of client device (e.g., desktop system, smartphone, tablet computer). The application which is executed to provide user interface 212 may comprise a Web Browser, a standalone application, or any other application.

Initially at S310, a first data set 402 is received. In one or more embodiments, the first data set 402 may be received from a Personal Identifying Information (PII) data source 404. The PII source 404 may be internal or external to the system 100. In one or more embodiments, the first data set 402 may be in a tabular format with columns specifying one or more attributes categories 401, and rows including values for each of the one or more attribute categories for an individual record or entity 403. Other suitable data formats may be used. As used herein, the terms "attributes" and "attribute categories" may be used interchangeably.

Next in S312, it is determined that at least one of the attribute categories 401 is a first-class identifier 406. As used herein, a "first-class identifier" may refer to a single attribute 401 that may allow for identification by itself (e.g., a single attribute that may label unique entities and describe the represented object in a one-to-one relation). Some non-exhaustive examples of first-class identifiers include user ID; phone number, credit card number, digital fingerprint, names, certificate or license numbers, health plan beneficiary numbers, social security numbers, URLs, IPs, biometric identifiers, etc. The first-class identifier 406 may be used to determine which attribute values to transform in order to reduce the number of records 403 that may be eliminated from the anonymized data set where the eliminated records would otherwise violate the anonymized data set. This may be done to reduce the levels of information loss while at the same time ensuring data anonymity.

In one or more embodiments, the first-class identifier 406 may be defined as:
Let F be a set of features $F=\{f_1, \ldots, f_n\}$, where each feature is a function $f_i: E \to A$ mapping the set of entities $E=\{e_1, \ldots, e_m\}$ to a set A of realizations of $f_i$.
A feature $f_i$ is called a 1st class identifier, if the function $f_i$ is injective, i.e. for all $e_j, e_k \in E: f_i(e_j)=f_i(e_k) \Rightarrow e_j=e_k$.

In one or more embodiments, the attribute 401 may be a first-class identifier 406 if each value for each entity 403 is only represented once in the entire dataset. In one or more embodiments to determine the attribute 401 is a first-class identifier 406, each individual attribute 401 may be evaluated by counting the unique values with regard to all other entities 403, and this may be combined with a SQL GROUP BY statement. In embodiments, to account for noise, less than 100% of the values of the attribute 401 may be unique for the attribute 401 to be considered a first-class identifier 406.

In one or more embodiments, the first-class identifier 406 may be determined based on at least one of two criteria: 1. Attribute cardinality and 2. entropy.

In one or more embodiments,
The cardinality $c \in \mathbb{Q}$ of a column or an attribute is defined as:

$$c = \frac{\text{number of unique entries}}{\text{total number of entries}}$$

Attributes 401 having a high cardinality may be determined to be a first-class identifier 406. In one or more embodiments, the attribute 401 may be considered a first-class identifier 406 where c>0.33. Other suitable thresholds may be used.

In one or more embodiments, entropy (Kullback-Leibler divergence) may be defined as:
Let p and q denote discrete probability distributions. The Kullback-Leibler divergence or relative entropy e of p with respect to q is defined as:

$$e = \sum_i p(i) \cdot \log\left(\frac{p(i)}{q(i)}\right)$$

Similar to the cardinality criteria above, attributes 401 having a high entropy, as compared to a threshold value, may be determined to a first-class identifier 406.

Turning back to the process 300, in S314, a pseudonymous data set 408 is generated by removing the attributes 401 columns (including associated values) identified as first-class identifiers 406 from the first data set 402. Removal of the attributes may be referred to herein as "sanitizing" the attribute. By removing the first-class identifier attributes, the pseudonymous data set 408 may not include any attribute that may directly identify a record/entity 403.

Then in S316, at least two of the attribute categories 401 in the pseudonymous data set 408 are determined to be a second-class identifier 410. A second-class identifier 410 may be a combination of attribute columns with any possible length, where the combination enables the identification of a record 403. In embodiments, the second-class identifier 410 may violate anonymity by being unique throughout the data set.

The second-class identifier 410 may be defined as:
Let $F=\{f_1, \ldots, f_n\}$ be a set of all features and $B:= \mathcal{P}(F)=\{B_1, \ldots, B_k\}$ its power set, i.e. the set of all possible feature combinations.
A set of selected features $B_i \in B$, is called a 2nd class identifier, if $B_i$ identifies at least one entity uniquely and all features $f_j \in B_i$ are not 1st class identifiers.

In one or more embodiments, the at least two attribute categories 401 may be determined to be second-class identifiers 410, based on the determination, for each possible combination of attributes in the pseudonymous data set 408, there is only one record(s) 403 with this combination.

In one or more embodiments, the attributes 401 in the pseudonymous data set 408 may be assessed for the second-class identifier 410 determination by determining a maximal partial unique column combination (mpUCC). In one or more embodiments, the mpUCC is a tuple of columns that serve as identifiers across the entire pseudonymous data set 408. In one or more embodiments, the anonymization module 155 searches the pseudonymous data set 408 for the UCC for each specific row (maximal partial) 403.

For example, the first data set 402 may describe medical adherence and the drug intake behavior of patients. While a patient ID may be the first-class identifier 406, the combination of last name and birthday or first name, age and street name may be a possible second-class identifier 410 for selective patient records. The restriction to selective patient records may be important in this context, as most patient records may be identifiable through last name and birthday, while that may not apply to all given records (maximal partial UCC).

In one or more embodiments, all possible combinations of columns in terms of forming the anonymized dataset is evaluated as follows:

$$C(n, r) = \binom{n}{r} = \frac{n!}{(r!(n-r)!)}$$

where n is the population of attributes, and r the size of the subset of n.

In considering the second-class identifiers of all lengths, the contributions of the subsets with fixed size may be summed. This may be expressed by:

$$C_2(n) = \sum_{r=1}^{n} \binom{n}{r} = \sum_{r=1}^{n} \frac{n!}{(r!(n-r)!)} = 2^n - 1$$

Then, for each column combination, the anonymization module 155 may apply a SQL GROUP BY statement on the data set for the particular combination and count the number of entries for each group. If there is just one row 403 represented for one value group, this combination may serve as mpUCC, and may be the second-class identifier 410.

It is noted that identifying second-class identifiers 410 is an NP-complete problem (e.g., the time required to complete the identification increases very quickly as the size of the problem grows), and in this instance, the time is $2^n$, where n is the number of attributes 403. This means, for example, that in a case of a data set with 40 attribute columns, $1.09 \times 10^{12}$ combinations may be assessed. If each combination requires 354 bytes on average, this sums up to nearly $30 \times 10^6$ kilobytes, so roughly 30 GB just to store those combinations. As such, it may be difficult to scale the identification of second-class identifiers 410.

To improve the scalability, in one or more embodiments, the second-class identifier 410 identification process may be optimized. For optimization, instead of searching for all possible combinations with all lengths for each row (mpUCC), the search may be limited to maximal partial minimal unique column combinations (mpmUCC). In one or more embodiments, mpmUCC includes a minimal number of finite columns identifying the record 403. For example, the anonymization module 155 may only find the minimal second-class identifier to prevent re-identification.

In one or more embodiments, the Minimal second-class identifier (mpmUCC) may be defined as:

A 2nd class identifier $B_i \in \mathcal{P}(F)$ is called minimal, if there is no combination of features $B_j \subset B_i$ that is also a 2nd class identifier.

Figure 9:
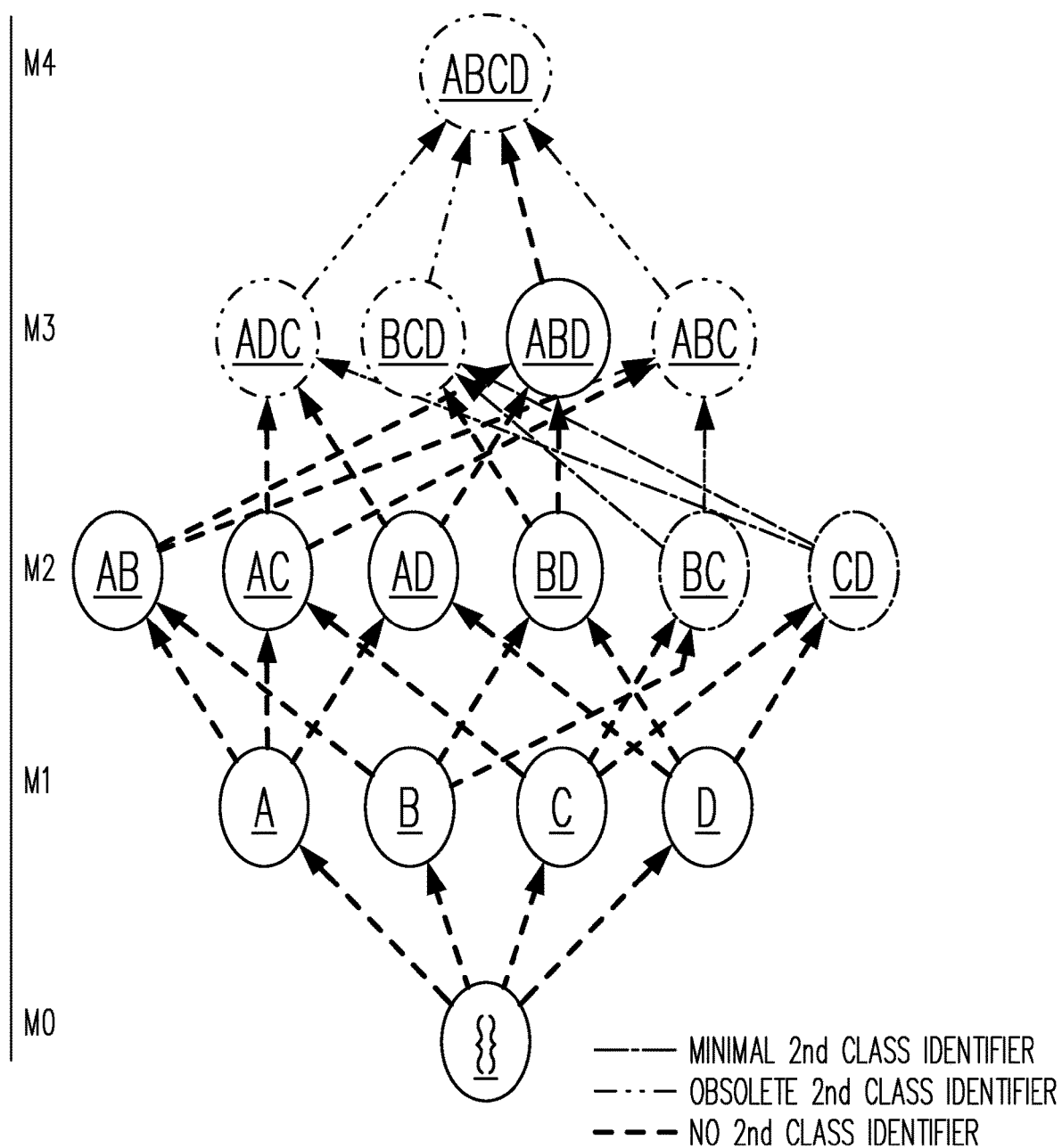
FIG. 9 is a graphical view according to some embodiments.

For example, continuing with the medical adherence and patient drug intake behavior example, after potentially identifying first name, age and street name (not shown) as the second-class identifier 410, any additional attribute to this group is still a second-class identifier. However, a minimal second-class identifier may contain just the minimal amount of attributes in the tuple which are needed to serve as a quasi-identifier (mpmUCC). In this example, the first name, age and street name are the mpmUCC and therefore, the second-class identifier 410. In one or more embodiments, the column combinations serving as mpmUCC may be (pre-) filtered by evaluating cardinality and entropy based features like the sum of their cardinality or its mean value against a given threshold. In one or more embodiments, both Cardinality and Entropy may be the Key Performance Indicators (KPI) to pre-filter mpmUCC candidates during the identification of $2^{nd}$ class identifiers. The filtration may be to avoid having to evaluate all possible combinations—instead embodiments may evaluate some specific ones. Those specific ones may be defined by thresholds on their Cardinality and Entropy. Given an observed distribution of tuple sizes regarding their expressed elements, the more tuples that exist, the more that may be filtered given a static threshold. Then, if no combinations are left for evaluation after filtering while the tuple length, that is up for evaluation, is incomplete with regard to re-arranging of binomial co-efficients, or while not all tree branches (FIG. 9) are covered by already found minimal second-class identifiers, the thresholds may be decreased successively. Having found a mpmUCC, the neighbors may be reviewed, as illustrated in FIG. 9. If no sibling or parent neighbor is an (minimal) identifier, the evaluation may stop for this branch. It is noted that this procedure is exact and not heuristic. Through this iterative and incremental process, effective run-time may significantly decrease, allowing the processing of datasets of 100 entity describing attributes in a few seconds on typical hardware.

Turning back to the process 300, in S318 the attributes 401 identified as second-class identifiers 410 are manipulated/treated. As used herein, the terms "manipulated" and "treated" may be used interchangeably. After identifying the second-class identifiers 410 that violate the definition of anonymity (i.e., make the record not anonymous), the identifiers that do adhere to anonymity may be classified. In one or more embodiments, the treatment may be attribute compartmentation, which may separate the attributes 401 in the second-class identifier 410 into subgroups, such that a unique identifier (e.g., second class identifier) no longer exists. Continuing with the original example, the age attribute may be separated from the gender attribute.

The compartmentation of attributes may be admissible as a family of feature sets, and may be defined as:

Let $Q = \{Q_1, \ldots, Q_n\}$ be a set of quasi-identifiers and denote with $F \subset Q$ a feature set (a set of quasi-identifiers). A family $\mathcal{F} = \{F_1, \ldots, F_m\}$ of feature sets, $F_i \subset Q$, $1 \leq i \leq m$, is called admissible, if:

$\forall F_i, F_j \in \mathcal{F}$, $i \neq j$: $Q = F_i \cup F_j$ is k-anonymous set of features for given data (k<1)

Figure 4:
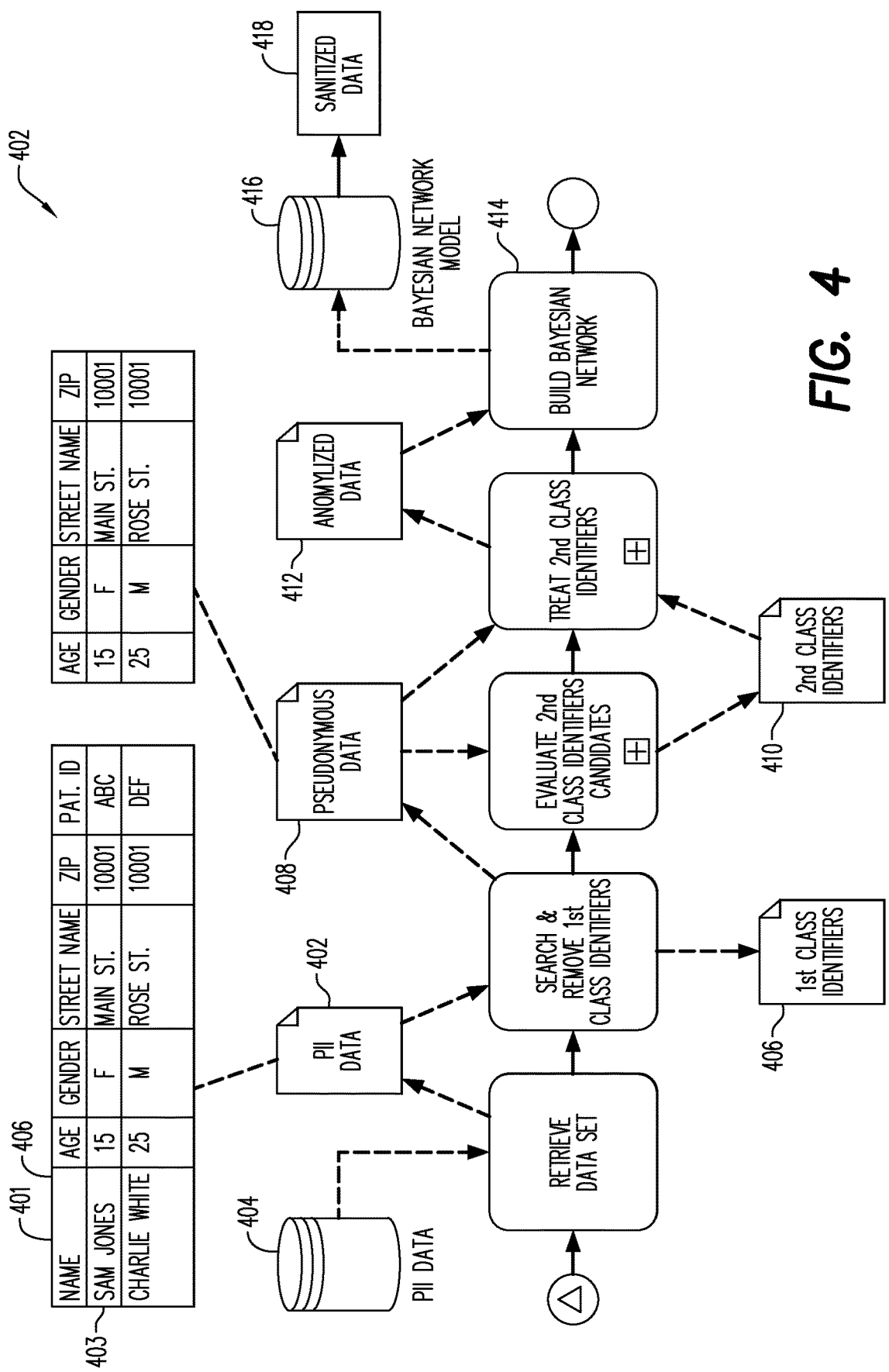
FIG. 4 is a block diagram according to some embodiments.

It is noted that compartmentation is distinguishable from partitioning, since partitions are intuitively disjunct (disjoined and distinct) from one another, while compartments are intended to overlap. Each further compartment implies an additional partial redundancy of the original dataset. In one or more embodiments, the column combinations marked for compartmentation (mpmUCCs) may be projected to a graph 500 (FIG. 4). It is also noted that compartmentation possesses a much lower complexity of $O(3^{n/3}) \approx O(1.4422^n)$ as opposed to generalization with $O(2^n)$, especially on high-dimensional datasets with comparable data quality results.

Figure 5:
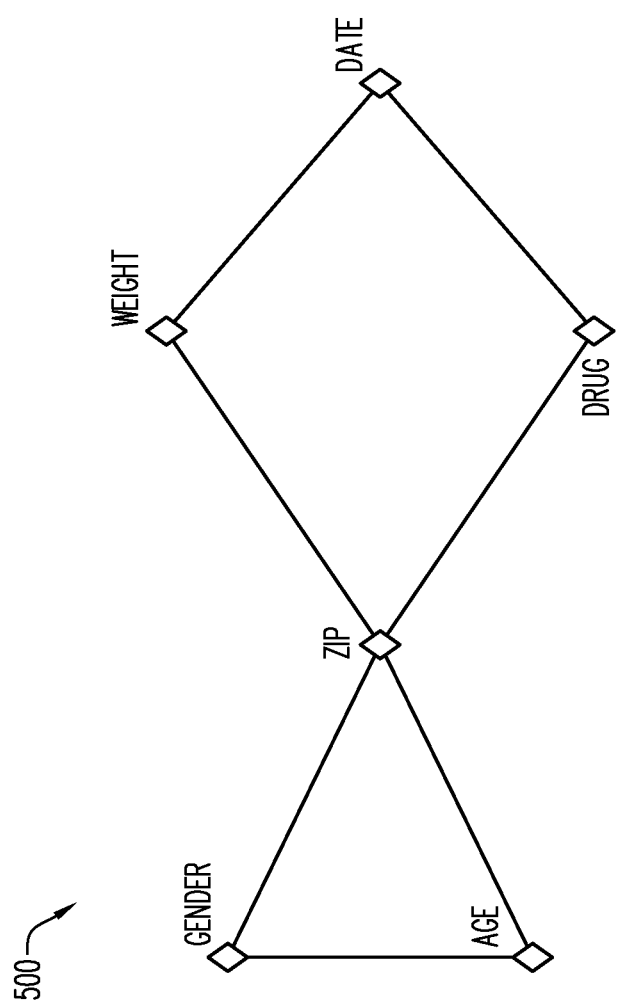
FIG. 5 is a graphical view according to some embodiments.

In FIG. 5, as a non-exhaustive example, the mpmUCCs or second-class identifiers 410 of (ZIP, GENDER, AGE) and (WEIGHT, ZIP, DATE, DRUG) are projected onto the graph 500. These second-class identifiers may be considered Quasi-identifiers because they violate anonymity requirements by uniquely identifying at least one single entity/record. This graph 500 may represent the attribute combinations (e.g., combination 1: ZIP, GENDER, AGE; combination 2: WEIGHT, ZIP, DATE, DRUG) which, when combined, violate anonymity (i.e. make the data record non-anonymous).

Figure 6:
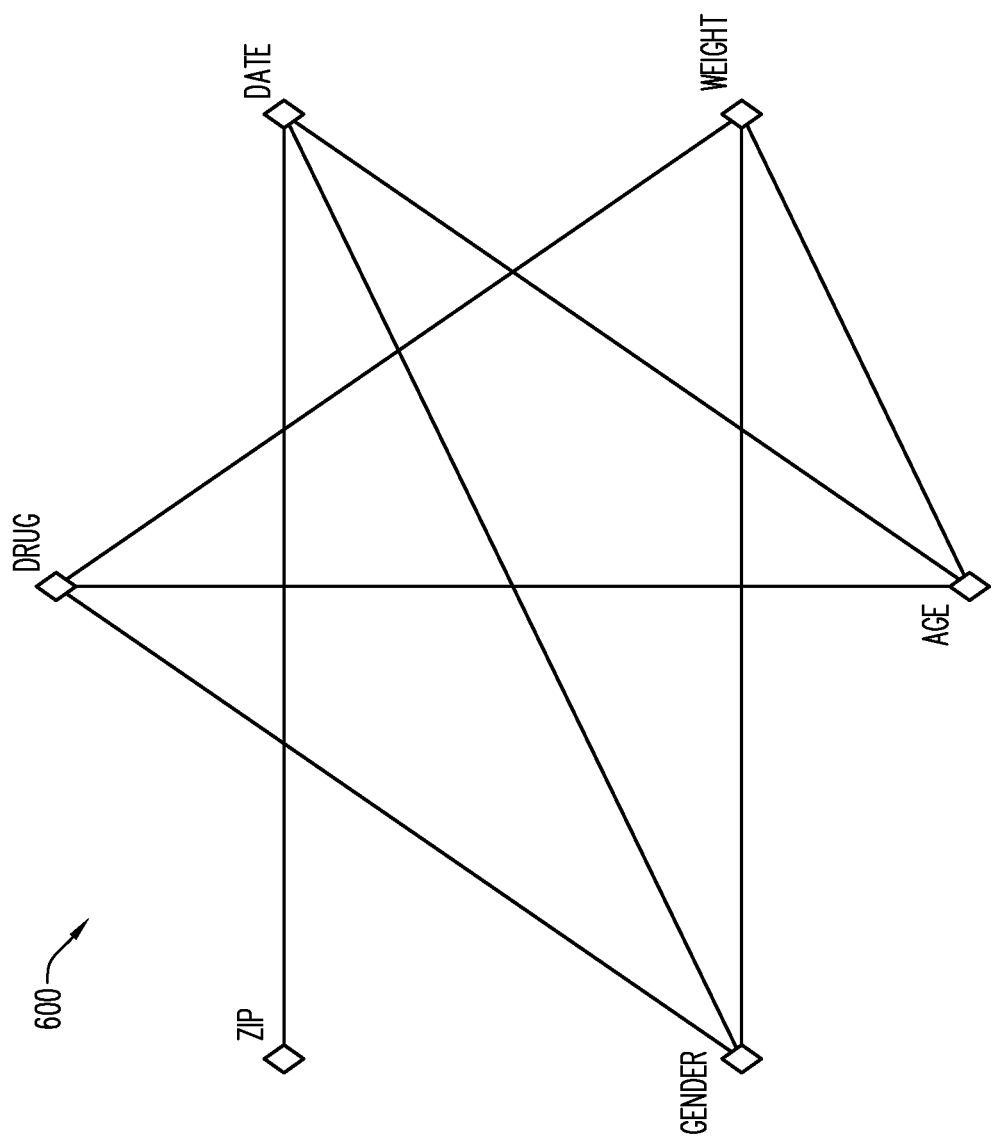
FIG. 6 is a graphical view of a graphical interface according to some embodiments.
Figure 7:
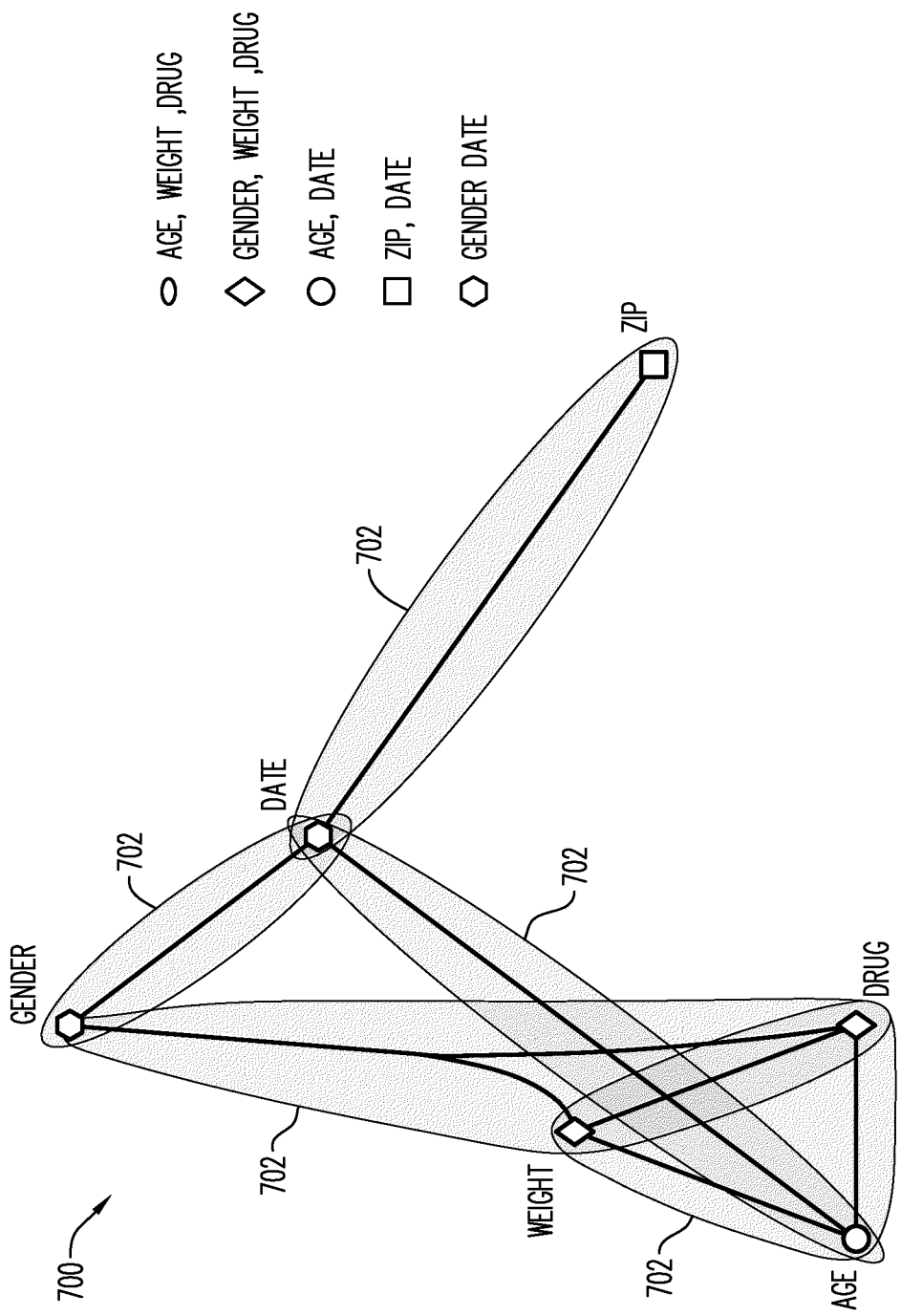
FIG. 7 is a graphical view of a graphical interface according to some embodiments.

Then, in S320, an anonymized data set 412 is generated based on the compartments. In one or more embodiments the anonymized data set 412 may be generated by inverting the graph representation in FIG. 5, resulting in an inversed graph 600 (FIG. 6). By inverting the unidirectional edges (where none have been, there is now an edge; and where there was an edge, there is now none), the inverted graph 600 may represent all of the attribute combinations which may be combined and still provide anonymity.

Next, in one or more embodiments, maximal cliques (i.e., attribute combinations with the lowest overlap and therefore lowest redundancy possible) are found in this graph, resulting in the identification of all potential and best compressed compartments which may be used to split the original dataset in parts not violating anonymization. For example, in the graph 700 in FIG. 7, the maximal cliques 702 are (age, weight drug); (gender, weight drug), (age, date); (zip, date); and (gender, date). These maximal cliques 702 may be all the attribute combinations which may be present in the anonymized data set 412 for the specific record (row) under treatment. In one or more embodiments, the maximal cliques 702 may be stored in two ways, either as separated tables, or as a full outer join filling up the missing values with null or NaN.

Generalization of data approaches are known to be vulnerable to homogeneity and background knowledge attacks. In one or more embodiments, these kinds of inference attacks may be circumvented by using Bayesian networks. In one or more embodiments, the anonymized data set 412 may be used to build a Bayesian network 414 including a Bayesian network model 416. In one or more embodiments, the Bayesian network 414 may be used to further ensure the data is anonymized, as well as to simultaneously reduce the storage size on large data sets. Bayes theorem describes the conditional probability for an event A occurring under the assumption of having prior information that B has already taken place. In one or more embodiments, the Bayesian network model 416 may store the likelihood that different data values may appear together. For example, if you have Age, Gender and Zip, the Bayesian network model 416 may store how likely it is that Age=15, Gender=female and Zip=10001 appear together. This way the storage size may be reduced, since only meta connections (probabilities of appearance—likelihood of appearance) are stored and not the actual and duplicated cases. Additionally, the use of the Bayesian network model 416 may result in rounding errors that occur when expressing conditional probabilities as doubles. In one or more embodiments, the rounding error may be introduced which may not be reproduced. The inventors note that there are some conventional anonymization techniques which introduce "random" noise, and this randomness may be compromised or rather reproduced to bypass the anonymization technique. To avoid this reproduction, embodiments may use a rounding error from the Bayesian network model, as it may not be reproduced/imitated. While the rounding error may be relatively small (e.g., up to the storage of a double ($2^8$ bit)), it may shift the likelihood of an inference attack of the unique aspects of a record from exact to probabilistic. In particular, an attacker, even if he is able to link data to an original owner, cannot be sure that it is exactly the owner. For example, Jane, 25 years old, living in Brooklyn and working for Big Co. might be the original owner, but might also be Jane's co-worker, who is actually Janet, since the name was alienated within the anonymization procedure. As such, embodiments may prevent an exact inference, and only allow a heuristic one, if at all.

After the Bayesian network 414 is built, data samples from the network may be obtained. In one or more embodiments, the Bayesian network model 416 represents the already anonymized data set, and by sampling from the model, an anonymized data set may be retrieved, and used for any suitable purpose. In one or more embodiments, a semantic anonymization process (e.g., interactive differential privacy pattern processes) may be applied to these data samples to statistically shift or alter the data set for anonymity. Other suitable semantic anonymization processes may be used. The result of the semantic anonymization process may be a sanitized data set 418 that may be returned in to the client response to a query, for example.

In one or more embodiments, the process 300, including the building of the Bayesian network, may be asynchronous with respect to an analytic (usage) query initiated by the client 140, and may be implemented ahead of a database query. In one or more embodiments, the asynchronous process may be run periodically to anonymize data within the system 100. With respect to usage, synchronous to a database query initiated by the client 140 request (e.g., researcher 210 in FIG. 2), samples are obtained from the Bayesian network 414 at runtime, and optionally these samples may be processed via steps S316-320, as described above, before sanitized data 418 is returned to the client 140. In one or more embodiments, the client request may not control the anonymization process, but rather may retrieve already anonymized data. In embodiments, the Bayesian network may be sampled and the data sanitized: 1. upon the first user request via the query; or 2. a priori the first user request; the sampling and sanitation may depend on the user's and/or owner's preference and system set-up.

Figure 8:
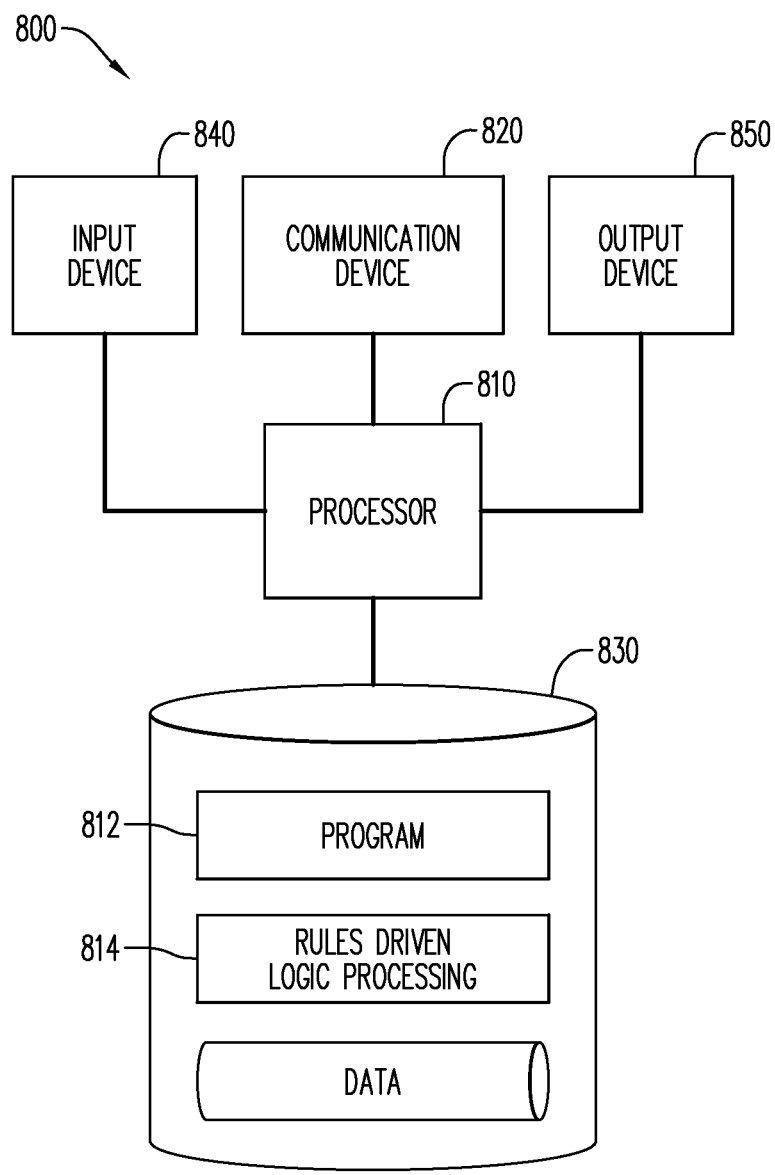
FIG. 8 is a block diagram of a system according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 100. Apparatus 800 may include other unshown elements according to some embodiments.

Apparatus 800 includes anonymization processor 810 operatively coupled to communication device 820, data storage device 830, one or more input devices 840, one or more output devices 850 and memory 860. Communication device 820 may facilitate communication with external devices, such as application server 130. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM) etc.

The storage device 830 stores a program 812 and/or anonymization platform logic 814 for controlling the processor 810. The processor 810 performs instructions of the programs 812, 814, and thereby operates in accordance with any of the embodiments described herein, including but not limited to process 300.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   at least one tabular data set, wherein each data set includes one or more attribute categories defining a record, each attribute category including one or more data values;
   an anonymization module; and
   an anonymization hardware processor in communication with the anonymization module and operative to execute processor-executable process steps to cause the system to:
     receive a first data set at the anonymization module;
     determine at least one of the attribute categories in the first data set is a first-class identifier;
     generate a pseudonymous data set by removing the at least one first-class identifier attribute category from the first data set;
     determine at least two of the attribute categories in the pseudonymous data set are a second-class identifier, by determining at least two attribute categories that are a maximal partial unique column combination (mpUCC) derived from a maximal partial minimal unique column combination (mpmUCC), wherein the mpmUCC includes a minimal number of finite columns identifying the record;
     manipulate the at least two second-class attribute categories; and
     generate an anonymized data set based on the at least two manipulated second-class identifier attribute categories.

2. The system of claim 1, wherein the determination that at least one of the attribute categories in the first data set is the first-class identifier is based on at least one of a cardinality and an entropy of the attribute category.

3. The system of claim 1, wherein the determination of the mpUCC further comprises processor steps to cause the system to:
   determine a maximal partial minimal unique column combination (mpmUCC.

4. The system of claim 1, wherein manipulation of the at least two second-class identifier attribute categories further comprises processor steps to cause the system to:
   separate at least three second-class identifier attribute categories into two or more overlapping sub-groups that do not constitute second-class identifiers.

5. The system of claim 1, further comprising process steps to cause the system to:
   build a Bayesian network model using the anonymized data set.

6. The system of claim 5, further comprising process steps to cause the system to:
   receive a query;
   retrieve a data sample from the Bayesian network;
   sanitize the retrieved data sample while processing the query; and
   return the sanitized data sample and a query response.

7. A method comprising:
   providing at least one tabular data set, wherein each data set includes one or more attribute categories defining a record, each attribute category including one or more data values;
   receiving a first data set at an anonymization module;
   determining, via an anonymization hardware processor in communication with the anonymization module, at least one of the attribute categories in the first data set is a first-class identifier;
   generating a pseudonymous data set by removing the at least one first-class identifier attribute category from the first data set;
   determining at least two of the attribute categories in the pseudonymous data set are a second-class identifier, by determining at least two attribute categories that are a maximal partial unique column combination (mpUCC) derived from a maximal partial minimal unique column combination (mpmUCC), wherein the mpmUCC includes a minimal number of finite columns identifying the record;
   manipulating the at least two second-class attribute categories; and
   generating an anonymized data set based on the at least two manipulated second-class identifier attribute categories.

8. The method of claim 7, wherein the determination that at least one of the attribute categories in the first data set is the first-class identifier is based on at least one of a cardinality and an entropy of the attribute category.

9. The method of claim 7, wherein the determination of the mpUCC further comprises:

determining a maximal partial minimal unique column combination (mpmUCC.

10. The method of claim 7, wherein manipulation of the at least two second-class identifier attribute categories further comprises:
separating at least three second-class identifier attribute categories into two or more overlapping sub-groups that do not constitute second-class identifiers.

11. The method of claim 7, further comprising:
building a Bayesian network model using the anonymized data set.

12. The method of claim 11, further comprising:
receiving a query;
retrieving a data sample from the Bayesian network;
sanitizing the retrieved data sample while processing the query; and
returning the sanitized data sample and a query response.

13. A non-transitory computer-readable medium storing program code, the program code executable by a computer system to cause the computer system to:
provide at least one tabular data set, wherein each data set includes one or more attribute categories defining a record, each attribute category including one or more data values;
receive a first data set at an anonymization module;
determine at least one of the attribute categories in the first data set is a first-class identifier;
generate a pseudonymous data set by removing the at least one first-class identifier attribute category from the first data set;
determine at least three of the attribute categories in the pseudonymous data set are a second-class identifier, by determining at least two attribute categories that are a maximal partial unique column combination (mpUCC) derived from a maximal partial minimal unique column combination (mpmUCC), wherein the mpmUCC includes a minimal number of finite columns identifying the record;
separate the at least three second-class identifier attribute categories into two or more overlapping sub-groups that do not constitute second-class identifiers; and
generate an anonymized data set based on the separated at least two second-class identifier attribute categories.

14. The medium of claim 13, wherein the determination that at least one of the attribute categories in the first data set is the first-class identifier is based on at least one of a cardinality and an entropy of the attribute category.

15. The medium of claim 13, wherein the determination of the mpUCC further comprises program to cause the system to:
determine a maximal partial minimal unique column combination (mpmUCC.

\* \* \* \* \*